United States Patent Office 2,734,889
Patented Feb. 14, 1956

2,734,889

PROCESS FOR THE POLYMERIZATION OF FORMALDEHYDE EMPLOYING METAL CARBONYL INITIATORS

Frank Clyde Starr, Jr., Wilmington, Del., assignor to E. I. du Pont de Nemours and Company, Wilmington, Del., a corporation of Delaware No Drawing. Application April 16, 1954, Serial No. 423,844

5 Claims. (Cl. 260—67)

This invention relates to the preparation of high molecular weight addition polymers of formaldehyde, and more particularly, it relates to the use of carbonyl initiators for the preparation of such polymers for formaldehyde.

In copending application Serial No. 423,855, filed by Langsdorf and Stamatoff on April 16, 1954, there are disclosed and claimed several metalorganic compounds which are useful initiators for the polymerization of formaldehyde. It has now been found that the carbonyls of the metals of group VIII, and particularly the iron group, of the periodic table are useful as initiators in the same polymerization process.

It is an object of this invention to provide a new class of initiators for the polymerization of formaldehyde. It is another object of this invention to provide processes for preparing addition polymers of formaldehyde in the presence of the carbonyls of the group VIII metals as polymerization initiators. Other objects will appear in the more detailed explanation of this invention which follows.

The above objects are accomplished by contacting purified formaldehyde with carbonyls of the metals of group VIII of the periodic table, and preferably with iron, cobalt, or nickel carbonyl, and allowing the formaldehyde to polymerize to an addition polymer of formaldehyde.

In the following examples there are illustrated several processes employing metal carbonyls as initiators for the polymerization of formaldehyde. Parts and percentages are by weight unless otherwise specified. Inherent viscosities are measured as a dimethylformamide solution at 150° C., the solution containing 0.5 gram of polymer and 1 gram of diphenylamine per 100 ml. of dimethyl formamide. Thermal stabilities are reported in terms of a reaction rate constant for thermal degradation at some temperature, e. g., 202° C. or 222° C., the method of determination being described in copending application Serial No. 443,702, filed by Dal Nogare and Punderson on July 15, 1954.

*Example 1.*—Monomeric formaldehyde was generated by pyrolysis of commercial paraformaldehyde at about 165° C. at the rate of about 125 grams per hour. The pyrolysis vapors were purified by passing them in series through two empty U-tube traps, maintained at 0° C. These traps removed about 20% by weight of the formaldehyde passing through. Monomeric formaldehyde vapors leaving these traps was then passed into a glass polymerization reactor containing the liquid reaction medium which was being rapidly stirred. The reaction medium consisted of three liters of n-heptane containing 0.0021 gram of nickel carbonyl. The reaction medium was maintained at 20° C. to 28° C. as monomeric formaldehyde was continuously passed into the reactor over a period of two hours, and as white polymeric formaldehyde particles formed continuously over that period. The dispersed polymeric particles were recovered by filtration and dried, the recovered amount of dry polymer being 116 grams. This polymer exhibited an inherent viscosity in dimethylformamide of 1.75, and was molded into a tough translucent film. The thermal stability of this polymer compared favorably with that of other polymers reported herein.

Essentially the same results were obtained by using other aliphatic hydrocarbons as the reaction medium and by varying the concentration of the nickel carbonyl from about 0.6 milligram to about 80 milligrams per liter of reaction medium.

*Example 2.*—Monomeric formaldehyde was generated and purified as described in Example 1. The reaction vessel was a five-liter, three-necked glass pot attached to the monomer stream, and fitted with a rubber diaphragm through which catalyst solution could be introduced through the needle of a hypodermic syringe. The reaction vessel was flushed with nitrogen by alternately evacuating the vessel followed by bleeding nitrogen into the vessel. The vessel was finally evacuated to about 5 mm. of mercury absolute pressure and then filled to 1 atmosphere pressure with monomeric formaldehyde vapors leaving the purification traps. A solution of 0.04 gram of nickel carbonyl in 0.5 cc. of ethyl ether was then introduced through a hypodermic syringe needle piercing the rubber diaphragm on the reaction vessel. A white cloud of polymer formed immediately, and as additional monomer from the pyrolysis and purification system was introduced into the reaction vessel, polymer formed continuously over the one hour reaction period. The pressure never reached atmospheric again during the experiment because polymer formed as fast as the monomer was introduced. The polymer cloud is settled in the reactor and formed a crusty solid in the bottom of the reaction vessel. The polymer was recovered in the amount of 71 grams and was found to be a high molecular weight addition polymer of formaldehyde. Tough translucent films were pressed from portions of this polymer, and the polymer exhibited a thermal stability which compared favorably with that of other polymers reported herein.

*Example 3.*—Five hundred grams of commercial paraformaldehyde was pyrolyzed at 165° C. over a period of 70 to 90 minutes. The pyrolysis vapors, as soon as they were formed, were continuously passed through a series of 2 cold traps maintained at 0° C., and thence into a polymerization reactor containing 500 ml. of n-heptane and 0.0029 gram of cobalt carbonyl. The n-heptane was prepared by topping 550 ml. of distilled n-heptane and removing the first 50 ml. of distillate. The reaction medium of n-heptane and cobalt carbonyl was agitated with a stirring mechanism at about 300 R. P. M. and maintained at about 18° C. to 26° C. during the reaction period of two hours. As fast as monomeric formaldehyde was introduced into the reactor, white particles of polymeric formaldehyde formed. At the end of the reaction period the dispersed particles were collected by filtration, washed twice with cyclohexane, and dried in a vacuum oven at 60° C. to 70° C. The recovered dry product was an addition polymer of formaldehyde in the amount of 40 grams, and the polymer exhibited an inherent viscosity in dimethylformamide of 2.97. A portion of this polymer was subjected to thermal degradation at 202° C. and was found to have a reaction rate constant of 0.21, indicating that this polymer had good thermal stability. This polymer was molded into a tough, translucent film by pressing at 205° C. for 1 minute.

Similar experiments were run in which the amount of cobalt carbonyl was varied from about 0.06 to 60 milligrams (mg.) per liter of reaction medium, and in each case a substantial amount of an addition polymer of formaldehyde was formed.

*Example 4.*—The same procedure as described in Example 3 was followed with the exception that 0.0034 gram of iron carbonyl was employed as the polymerization initiator in place of the cobalt carbonyl specified in Example 3. The reaction temperature was about 22° C. to 25° C. There was recovered 45 grams of white polymeric formaldehyde powder which exhibited inherent viscosities in dimethylformamide of 2.90 and 2.92 in duplicate runs. The polymer was found to have a reaction rate constant for thermal degradation at 202° C. of 0.65, indicating a thermal stability which is not as good as that possessed by the polymer of Example 3, although the polymer of this example was formed into a tough, translucent film by pressing at 205° C. for 1 minute.

Similar experiments were run in which the amount of iron carbonyl was varied from 0.7 to 7.0 milligrams (mg.) per liter of reaction medium, and in each case a substantial amount of an addition polymer of formaldehyde was formed.

*Example 5.*—The same procedure as described in Example 3 was followed with the exception that 0.0013 gram of nickel carbonyl was employed as the polymerization initiator instead of the cobalt carbonyl specified in Example 3. The temperature of the reaction was 21° C. to 24° C. There was recovered 41 grams of white addition polymer of formaldehyde exhibiting an inherent viscosity in dimethylformamide of 2.69 and 2.65 in duplicate runs. A portion of this polymer was slurried with an ether solution of diphenylamine, the amount of amine being 2% by weight of the polymer. After the ether had evaporated, the polymer was pressed into tough translucent films. The treated polymer had a reaction rate constant for thermal degradation at 202° C. of 0.23, indicating a thermal stability as good as that of the polymer prepared by the process of Example 3.

*Example 6.*—Monomeric formaldehyde was generated by pyrolyzing commercial paraformaldehyde which was in the form of a slurry in cyclohexanol. The pyrolysis temperature was about 110° C. The pyrolysis vapors were passed continuously through one air-cooled trap maintained at room temperature and then through a series of two U-tube traps maintained at 0° C., the first tube being empty and the second tube being filled with a stainless steel packing. Vapors leaving the last of these traps were then passed into a polymerization reactor containing one liter of heptane which had previously been topped to the extent of about 10%. The heptane contained 0.079 gram of nickel carbonyl as a polymerization initiator and 0.021 gram diphenylamine as an antioxidant. The monomeric formaldehyde vapors were continuously passed into the reactor over a period of two hours and particles of polymeric formaldehyde formed continuously during this period. The reaction medium was maintained at a temperature of 25° to 30° C. The product which formed was separated from the reaction medium and was found to be an addition polymer of formaldehyde in the amount of 58.2 grams, and exhibiting an inherent viscosity as measured in dimethylformamide of 4.00.

The above examples illustrate several combinations of process conditions which may be employed with the carbonyl initiators of this invention in the preparation of addition polymers of formaldehyde. The polymerization may take place in the presence of or the absence of a liquid reaction medium or in a vapor phase reaction. Any liquid which is inert to the reactants and to the product is suitable as the reaction medium in the polymerization process of this invention. Suitable reaction media are the hydrocarbons, including aliphatic cycloaliphatic, and aromatic, hydrocarbon halides, ethers, etc. The preferred reaction media are the hydrocarbons of 3 to 10 carbon atoms, for example, propane, butane, pentane, hexane, heptane, octane, nonane, decane, cyclohexane, decahydronaphthalene, benzene, toluene, and xylene.

The temperature and pressure of the reaction are not critical. Temperatures may vary from the freezing point to the boiling point of the reaction medium, which range is from about −110° C. to about 100° C. Atmospheric pressure is normally employed for convenience, although the pressure may be subatmospheric or superatmospheric in certain embodiments of this invention. The preferred temperature range is from about −50 C. to about 50° C. and the preferred pressure is atmospheric.

The formaldehyde monomer may be derived from any source although the formaldehyde should be purified prior to polymerization. Sources of formaldehyde include paraformaldehyde, alpha-polyoxymethylene, formaldehyde solutions, and the hemiformals. It is desirable that the formaldehyde monomer be substantially anhydrous when high molecular weight polymers are to be made therefrom. "Substantially anhydrous formaldehyde," in this invention, is intended to mean monomer containing less than 0.5% by weight of water, and preferably less than 0.1% by weight of water. A final purification may be obtained by passing formaldehyde through one or more cold traps held at about 0° C. or less. These traps may be in the form of empty U-tubes, packed U-tubes, liquid hydrocarbon through which the formaldehyde is bubbled, or other forms similar to chemists and engineers.

The amount of reactants is not critical. The weight ratio of formaldehyde to reaction medium may vary from about 1:1 to about 1:1000, the choice depending on the thickness desired in the slurry which is formed during the reaction. Preferred limits are about 4 to 100 parts by weight of reaction medium per part of formaldehyde polymer, it being understood that essentially all the formaldehyde monomer is recovered as polymer.

The initiator is a carbonyl from a metal of group VIII of the periodic table and therefore includes iron, cobalt, nickel, ruthenium, rhodium, palladium, osmium, iridium and platinum. The preferred metals from the above group form the "iron group," including iron, cobalt, and nickel.

The amount of initiator is not critical, since extremely small concentrations have been used satisfactorily, and large concentrations cause no adverse effects on the polymerization reaction. Practical considerations might allow the initiator concentration to vary from about 0.1 to about 20 milligrams per liter of reaction medium when the reaction medium varies from about 4 to 100 parts per part of formaldehyde polymer as described above. In a vapor-phase reaction the above limits are still applicable, namely, from about 0.1 to about 20 milligrams per liter of reaction volume. It is to be understood however that more than 20 milligrams of initiator per liter of reaction medium (or volume in the vapor-phase reaction) is operable and that this invention is not restricted by any upper limit on the amount of initiator.

The initiator is normally placed in the reactor prior to the introduction of the monomeric formaldehyde, although this procedure is not critical since the formaldehyde may be introduced first so as to saturate the medium prior to introduction of the initiator by injection methods.

The process of this invention may incorporate the use of antioxidants, dispersants, mixtures of initiators, and other features which might occur to skilled chemists. For example, secondary or tertiary aromatic amines, such as diphenylamine, may be employed in the polymerization reaction to reduce oxidative effects. Other initiators such as triphenylphosphine, aliphatic amines, polymeric tertiary amines and metalorganic compounds may be used in conjunction with the carbonyl initiators of this invention.

The polymers produced by the process of this invention may be acylated to improve their thermal stability by the process described in copending application Serial No. 443,702 filed by Dal Nogare and Punderson on July 15, 1954.

Polymers made by the process of this invention are useful in the preparation of films, fibers, filaments, and molding compositions. Formaldehyde polymers having a high molecular weight are exceptional in their tough-

I claim:

1. A process for polymerizing formaldehyde comprising contacting substantially anhydrous monomeric formaldehyde with a catalytic amount of a polymerization initiator which is a carbonyl of a metal from Group VIII of the Periodic Table, and recovering a high molecular weight addition polymer of formaldehyde.

2. The process of claim 1 in which the metal is selected from the group consisting of iron, cobalt, and nickel.

3. A process for preparing a high molecular weight addition polymer of formaldehyde comprising contacting substantially anhydrous monomeric formaldehyde at a temperature from about $-110°$ C. to about $100°$ C. with a catalytic amount of a carbonyl of a metal from the group consisting of iron, cobalt, and nickel.

4. A process for preparing a high molecular weight addition polymer of formaldehyde comprising introducing substantially anhydrous monomeric formaldehyde into a liquid hydrocarbon, having 3 to 10 carbon atoms per molecule, in the presence of a carbonyl of a metal from the group consisting of iron, cobalt, and nickel, at a temperature of $-50°$ C. to $50°$ C., agitating said liquid hydrocarbon and forming a dispersion of a high molecular weight addition polymer of formaldehyde in said liquid hydrocarbon.

5. The process of claim 4 in which the carbonyl is present in the amount of 0.05 to 20 milligrams.

References Cited in the file of this patent

UNITED STATES PATENTS 2,296,249    Austin et al. _____ Sept. 22, 1942

OTHER REFERENCES

Walker: Jour. Amer. Chem. Soc., 55, 2821–6 (1933).
Walker: "Formaldehyde," pages 91–94, published by Reinhold Publishing Corp., N. Y. (1944).